UNITED STATES PATENT OFFICE.

WILBER R. MEEDS, OF NEWARK, OHIO.

LANTERN-OIL.

SPECIFICATION forming part of Letters Patent No. 250,830, dated December 13, 1881.

Application filed October 18, 1881. (No specimens.)

*To all whom it may concern:*

Be it known that I, WILBER R. MEEDS, of Newark, in the county of Licking and State of Ohio, have invented certain new and useful Improvements in Lantern-Oils; and I do hereby declare that the following is a full, clear, and exact description of the invention, which will enable others skilled in the art to which it appertains to make and use the same.
The object of my improvement is threefold, viz: first, to compound a burning-oil suitable for lanterns, which will not freeze under ordinary conditions, but only in extremely cold weather; secondly, that will not smoke, but burn with a clear, bright, and lively light without "coaling" the wick; and, thirdly, which can be manufactured at about one-half the cost of the better class of lantern-oils now in general use.
To prepare my improved lantern-oil, I proceed as follows, the proportions given being for about three gallons of the oil: I first take three and three-quarters (3¾) pounds of strained tallow and heat the same till it shall have reached a temperature of from 140° to 160° Fahrenheit. I then add to it one gallon of commercial No. 1 lard-oil and one gallon sperm burning-oil. Agitate the whole mass thoroughly until it commences to cool, and then add one-half pint of turpentine—that is, one-half pint to every three gallons of the compound—and stir the whole mass thoroughly till perfectly cold, when it is ready for use.

This oil will compare favorably with the very best and most expensive lantern-oils in use, and can be produced at about one-half the cost of the same. It burns with an exceedingly clear and bright light, without smoking, and does not freeze in the ordinary winter temperature of Canada and the Northern States, even in the most exposed situations. It is used the same as lard-oil or sperm-oil, in the same kind of lamps or lanterns, and with the wicks ordinarily used for these oils.

Having thus described my invention, I claim and desire to secure by Letters Patent of the United States—

A lantern-oil composed of the following ingredients, mixed in about the proportions stated: one gallon lard-oil, one gallon sperm burning-oil, three and three-quarters pounds strained tallow, and one-half pint turpentine, substantially as set forth.

In testimony that I claim the foregoing as my own I have hereunto affixed my signature in presence of two witnesses.

WILBER REED MEEDS.

Witnesses:
MILTON MAURICE TAYLOR,
WILLIAM THOS. SMITH.